United States Patent [19]

Nimchuk

[11] 4,136,631
[45] Jan. 30, 1979

[54] PORTABLE SAIL STRUCTURES

[76] Inventor: Allan Nimchuk, 4228-15a St. SW., Calgary, Alberta, Canada

[21] Appl. No.: 807,817

[22] Filed: Jun. 20, 1977

[30] Foreign Application Priority Data

Jun. 24, 1976 [CA] Canada ................................. 255644

[51] Int. Cl.² ............................................. B63H 9/04
[52] U.S. Cl. .................................................... 114/103
[58] Field of Search ................. 114/39, 102, 103, 108, 114/205, 216, 217, 247; 244/153 R, DIG. 1; 280/11.37 S; 24/115 R, 115 F, 115 M, 115 G, 136 A, 244

[56] References Cited

U.S. PATENT DOCUMENTS

| 1,479,243 | 1/1924 | Kamrath | 24/244 |
| 1,646,068 | 10/1927 | Rosner | 24/244 |
| 1,859,178 | 5/1932 | Sprinkle | 114/39 |
| 3,083,992 | 4/1963 | Post | 114/247 |
| 3,768,823 | 10/1973 | Goldberg | 280/11.37 S |
| 3,936,012 | 2/1976 | Murray | 244/DIG. 1 |

FOREIGN PATENT DOCUMENTS

| 2345162 | 3/1975 | Fed. Rep. of Germany | 244/153 |
| 1417095 | 12/1975 | United Kingdom | 244/153 R |

OTHER PUBLICATIONS

Pelham, David, *Kites*, 1976, p. 212.

*Primary Examiner*—Galen L. Barefoot
*Assistant Examiner*—Jesus D. Sotelo
*Attorney, Agent, or Firm*—Shlesinger, Arkwright, Garvey & Dinsmore

[57] ABSTRACT

The invention relates to folding sail assembly for utilization as propulsion for small water craft, and persons on ice or roller skates. The invention comprises a kite frame including a main mast, a pair of transversally extending boom sections releasably coupled to the main mast intermediate itslength, and a sail stretched about the frame and releasably attached to the mast and boom sections. Each boom section being adapted, through the coupling mechanism, to be folded to a position parallel with the mast for transportation purposes. The invention may include as part of the frame at least one tail member positioned as to extend normal to the mast and attached to the rearmost end thereof, the tail portion of the sail material being attachable to this rearmost extension of the frame. The invention can be further enhanced by the provision of a fail-safe mechanism which ensures that when the frame or sail material is subjected to high external forces likely to cause an accident or damage to the device the frame will automatically collapse.

5 Claims, 6 Drawing Figures

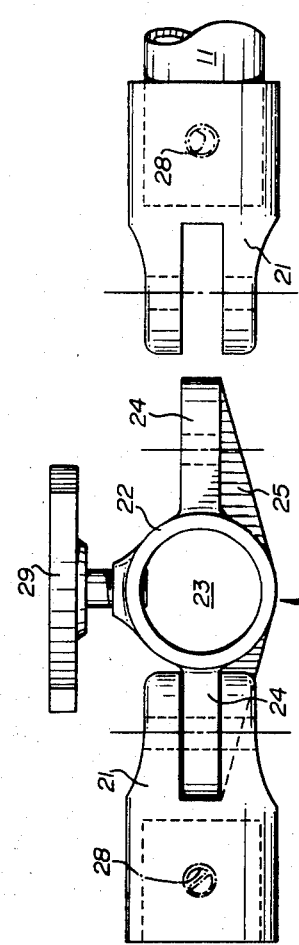
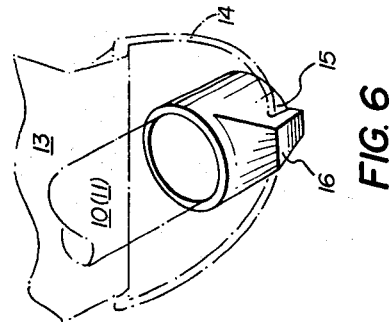
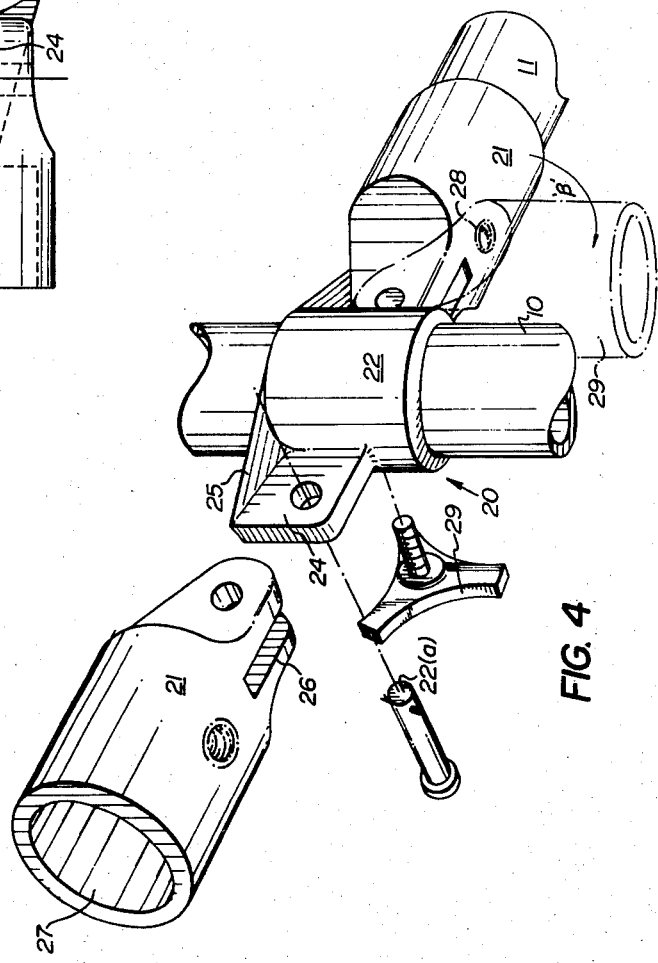

PORTABLE SAIL STRUCTURES

FIELD OF INVENTION

The invention relates to improvements in hand held sail devices, utilized in conjunction with ice skates, roller skates and small water craft as a propulsion means, and more particularly to a device that is both lightweight, and readily collapsible to a compact transportable condition.

BACKGROUND OF THE INVENTION

Such devices have been used to propel skaters since the late 1800's as evidenced by U.S. Pat. No. 302,517 which issued to C. H. Nelson in 1884. This device consisted essentially of a large, generally rectangular sail, adapted to be secured to the body of the skater. The main mast and yards were formed in detachable sections to enable the device to be taken apart for ease of transportation. While the user, by manipulation of the lower half of the sail, has some degree of control on for example his speed, and could by body movement affect a change of direction, the device would be difficult to control in high wind situations in view of the large sail area, and since the sail was in fact strapped to the skaters back, the structure could not be collapsed sufficiently quickly to avoid an accident.

Numerous attempts were made to improve the skate sail concept and in 1932, S. A. Sprinkle designed a folding skate sail which became the subject of U.S. Pat. No. 1,859,178. This device took the general form of an isosceles triangle and consisted of a central vertical main mast and upper and intermediate sail bracing members extending transversally of the main mast, each of the aforesaid members being detachably secured to the main mast and to the sail to provide support therefore. Sprinkle, however, designed his device such that it is hand held and would be dimensionally small enough to enable the user to fold it to a size suitable to be placed in the pocket. Bearing this in mind, it is difficult to envisage such a device being capable of propelling the user at any high speed over ice and snow, as is claimed. Even if the components were enlarged to provide a sufficiently large sail area, the device would be difficult to control and thus dangerous. Furthermore, when utilizing this device on, for example, a straight race track, the prevailing wind conditions would make it extremely difficult for the user to return to the starting line after each race. The user is therefore faced with the inconvenience of having to take the device to pieces at the end of each race, and to reassemble same before the next race.

Finally, attention is drawn to U.S. Pat. No. 3,768,823 which issued in 1973 to Daniel E. Goldberg. The device according to this invention comprises a skate sail having a sectional mast and boom, each preferably made of three telescoping sections secured one to the other by a slotted male coupling telescopingly interfitting with the end portions of the mast and boom. Three jamb cleats are provided one at each end of the mast and one at the tail end of the boom. These cleats comprise an insert into the tubular aluminum alloy mast and boom on a wooden or plastic member having a jamb notch cut longitudinally therein and having a width sufficiently wider than the width of the halyard or lanyard line used to secure the sail and tapering to a width substantially less than the diameter of the line. Adjacent the narrow end of the jamb notch there is preferably a hole through which the line is passed with one end being secured to the cleat member by knotting the end of the line. The jib is curved and preferably made of three sections, and the tail bow is made of one flexible piece and is secured to the tail end of the boom by a lanyard.

It should be readily apparent from the above that this device is extremely complex in construction and some considerable effort is required in assembling the device to a useable condition. Apart from the relatively high manufacturing costs this device suffers the same disadvantages as the Sprinkle sail in that the device has to be completely taken to pieces for ease of transportation against the prevailing wind.

SUMMARY OF THE INVENTION

The present invention seeks to overcome the aforementioned disadvantages by providing a simple, rugged, sail construction which is adapted to be collapsible to a carrying position without necessitating complete disassembly, and can subsequently be quickly and easily extended to an operable configuration.

Accordingly the invention comprises a kite frame including a main mast, a pair of transversely extending boom sections releasably coupled to the main mast intermediate its length, and a sail stretched about the frame and releasably attached to the mast and boom sections. Each boom section being adapted, through the coupling mechanism, to be folded to a position parallel with the mast for transportation purposes. The invention may include as part of the frame at least one tail member positioned as to extend normal to the mast and attached to the rearmost end thereof, the tail portion of the sail material being attachable to this rearmost extension of the frame.

The invention can be further enhanced by the provision of a fail-safe mechanism which ensures that when the frame or sail material is subjected to high external forces likely to cause an accident or damage to the device the frame will automatically collapse.

BRIEF DESCRIPTION OF THE DRAWINGS

The invention will now be described by way of example only, reference being had to the accompanying drawings in which:

FIG. 4 shows the preferred form of coupling between the main mast and the transversely extending boom sections;

FIG. 5 is an end elevation of the coupling according to FIG. 4, and;

FIG. 6 shows an alternative arrangement facilitating the releasable attachment of the sail material to the frame sections.

DESCRIPTION OF THE PREFERRED EMBODIMENT(S)

Figure 1:
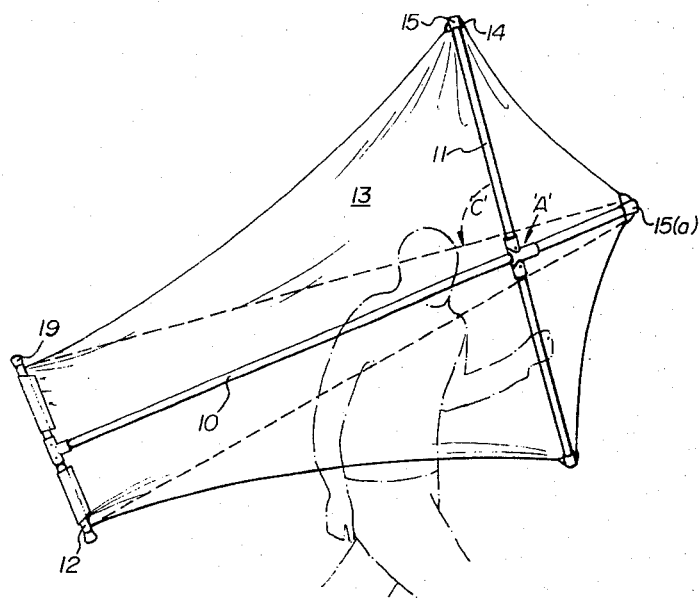
FIG. 1 is a schematic representation of the device according to the invention as it may be used.

The basic configuration of the device according to the preferred form of invention can be seen from FIG. 1. The structural elements consist essentially of a frame comprising a main mast 10 preferably formed of lightweight tubular material, which, while shown as one piece, may for ease of transportation, be provided in detachable sections; a pair of tubular transversally extending boom members 11 releasably coupled to the main mast intermediate its length at "A;" a tubular transverse tail member 12 releasably attached to one extremity of mast 10; and a sail 13 stretched between and attachable to the mast, boom and tail member. The particular configuration of tail member 12 provides for an increase in sail area, but as will be appreciated, member 12 could be omitted and the sail material attached directly to the tail end of mast 10.

The sail 13, which may be manufactured in a nylon or suitable lightweight fabric, is provided at its forward end with leather corner enforcements and associated D-ring connectors 14 (see FIG. 6). The reinforcements are of the type commonly used in the manufacture of aerial kites and the like and are provided at the corners of the sail where attachment to the booms 11 and mast 10 is affected and the D-ring connectors are, in this instance, permanently secured to the reinforcing material to facilitate attachment as will be hereinafter described.

Figure 2:
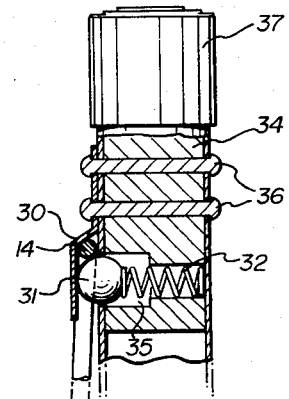
FIG. 2 shows a preferred example of the means for attaching the sail to the extremities of the main mast and boom sections.

A preferred method of attaching the sail 13 to the frame can be seen from FIG. 2. This particular mechanism provides the invention with a desirable safety feature in that it allows the frame to collapse when subjected to excessive external forces as will happen, when, for example, the sail accidentally comes into contact with the ground, or a sudden gust of wind applies a shock load to the frame via the sail. This feature therefore additionally tends to prevent personal injury and unnecessary damage to the sail material, or the frame of the kite.

The essential components of the mechanism consist in a spring clip 30 and associated spring loaded ball 31. Ball 31 and spring 32 are seated within a wooden or plastic plug 34 which is press-fitted into the end of mast 10. A hole 35 is provided through the tubular mast to permit the ball to come into contact with spring clip 30 the latter being held in place by rivets 36 which secure the mechanism to the end of the mast. The assembly is then completed by the addition of a plastic cap 37.

In use, D-ring 14 is snapped into position as shown and is retained by the combined spring action until such time as the external forces applied to the D-ring 14 exceed the tension of the springs. At that time, the D-ring pulls free and the frame collapses. As will be appreciated, the point at which the mechanism will release the D-ring can be controlled by selection of springs and spring materials.

In the embodiments according to FIGS. 1 and 6, and in order to secure the sail to the ends of the booms 11 and the foremost end of mast 10, simple caps 15 (FIG. 6) may be provided, adapted for attachment to the projecting ends of the booms and mast. In the embodiment shown, these caps 15 are generally cylindrical with a longitudinally extending blind hole, the diameter of which being such that when the end of the boom or mast is inserted therein, the components mate tightly together. A portion of the outer surface of the cap is formed into a projection, or hook 16, which extends from the open end of the cap rearwardly thereof and it is this hook which is engaged by the D-ring 14 to maintain the sail in tension about the frame of the device.

While it is feasable in the sail device on FIG. 1, to utilize three of the mechanism, according to FIG. 2, one on each end of the booms, and one for the main mast, it may only be necessary to utilize the former, since this would be sufficient to allow the booms to be collapsed to a readily transportable condition.

Figure 3:
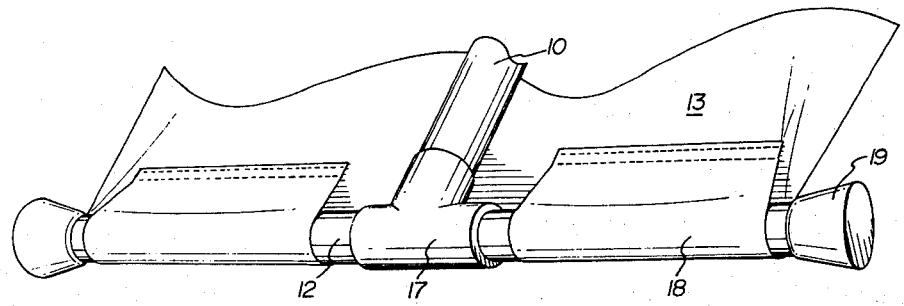
FIG. 3 is a detailed view of one form of tail assembly for the device.

FIG. 3 shows in detail, the tail member 12, its attachment to the main mast 10, and the manner in which the sail 13 is attached to each extending portion of member 12.

In the preferred form of construction, the tail section of the sail device comprises a "Tee" coupling 17 into which the rearmost end of the main mast 10 is inserted, member 12 being passed through the other portion of coupling 17 and fastened in place by, for example, a locking screw (not shown). This specific method of assembly is not however the only method which can be utilized. For example, member 12 may alternatively be supplied in two equal lengths, each having a threaded end portion adapted to be received within its respective tapped bore in coupling 17.

The sail, as can be seen from FIG. 3, is formed into two end pockets 18 through which member 12 is inserted. Plastic protective caps 19 are then placed over each outer end of member 12 to complete the assembly.

A significant feature of the device according to the invention resides in the utilization of an articulated central coupling indicated generally at "A" at FIG. 1 and showed in its preferred form of construction in FIGS. 4 and 5. It is this coupling that permits the sail to be collapsed for transportation, or to collapse under undue stress.

The preferred arrangement shown in FIGS. 4 and 5 is essentially a three component structure, a central sleeve member 20 and two transversally extending coupling members 21 pivotally connected to member 20.

In its preferred form, member 20 is manufactured from a lightweight alloy material, the finished casing having a main body portion 22 substantially cylindrical in form with a central bore 23. The diameter of bore 23 being sufficient to provide a sliding fit with main mast 10 on which member 20 is adapted to be positioned.

Member 20 is additionally formed to have two transversally extending wing portions 24 and projecting abutments 25, the purpose of which abutments will be explained hereafter.

Coupling members 21 are also preferably formed from lightweight alloy material and their purpose is that of providing a receptor for each of booms 11. In their disclosed form of construction, each of members 21 is essentially of cylindrical configuration, one end 26 being formed into a fork-like attachment, and the other end being provided with a blind bore 27, into which the end portion of boom member 11 is inserted. Boom members 11 can be fixedly held with their respective coupling members 21 in a number of ways. For example, they may be secured by adhesive, or, as shown in dotted outline on FIG. 4 by screw 28.

Coupling members 21 are in this embodiment detachably secured to wing portions 24 of member 22, by pin means 22(a). These pin means act as pivot points about which members 21 rotate in the direction of arrow "B" (FIG. 4), to a position 29, indicated in phantom. In this folded condition coupling members 21 and their associated boom members 11 will lie parallel with main mast 10. As will be appreciated, pivotal movement is only required through a 90° quadrant to facilitate folding of the sail. Thus the purpose of abutments 25 is to restrain movement in an opposite direction to folding, by providing a physical stop against which a portion of member 21 will come into contact when the booms 11 are in their transversally extended, operable position. The entire coupling assembly is locked to the main mast by means of screw member 29.

The method of assembling the kite according to the invention will not be described, since it is believed this will be a matter of choice by the user, and as such, self-evident from the description provided heretofore.

In use, as will also be self-evident, when for example the skater wishes to retrace his path quickly against the wind, all that is required is to release the lock provided by screw member 29, slide coupling 20 towards the foremost cap 15a (FIG. 1), and thus permit the booms 11 to be folded in the direction of arrow C on FIG. 1. This will effectively reduce the area of sail susceptible to wind forces and thus make the device readily transportable.

Further modifications and alternative embodiments of the invention will be apparent to those skilled in the art in view of the foregoing description. Accordingly, this description is to be construed as illustrative only, and is for the purpose of teaching those skilled in the art the manner of carrying out the invention. It is further understood that the form of the invention herewith shown and described is to be taken as the presently preferred embodiment. Various changes may be made in the shape, size and general arrangement of components. For example, equivalent elements may be substituted for those illustrated and described herein, parts may be used independently of the use of other features, all as will be apparent to one skilled in the art after having the benefits of the description of the invention.

What is claimed is:

1. A folding sail assembly comprising:
   (a) a supporting frame including:
      (i) a main mast;
      (ii) a pair of boom members attached to said mast intermediate its length by coupling means such that said boom members are pivotable about said coupling means between an inoperative position wherein said members lie adjacent and substantially parallel with said mast and an operative position wherein said members extend at an angle relative to said mast said coupling means being slidable along said mast for facilitating shifting of said boom members between said inoperative and operative positions;
      (iii) spring loaded said retention members adjacent each distal end of said mast and said boom members, and attached thereto; and
   (b) a sail member stretched about said frame and releasably secured to said mast and boom members by engagement with said retention members whereby when said sail assembly is subjected to external forces likely to cause injury, said sail member will be released from said retention members and said boom members will collapse to said inoperative position.

2. The assembly according to claim 1 wherein said coupling means comprises:
   (i) a first coupling portion adapted to be releasably attached to said mast;
   (ii) means to lock said first portion to said mast;
   (iii) second and third coupling portions being receptors for said boom members, pivotally attached on opposing sides of said first coupling portion; and
   (iv) stop means, forming part of said first coupling portion, permitting pivotal movement of said boom members about said first coupling portion through an arc of 90°.

3. The assembly according to claim 1 wherein said frame includes at least one tail member attached to said mast extending transversally an equal distance on either side thereof.

4. The assembly according to claim 1 wherein said sail member is provided with D-ring type connectors to facilitate attachment to said sail retention means.

5. The assembly according to claim 1 wherein said sail retention means comprises cap means, adapted for attachment to the distal ends of said mast and boom members, a portion of the outer surface of said cap means being formed into a projection which facilitates attachment of said sail member.

* * * * *